The invention described herein may be manufactured and used by or for the Government, for governmental purposes, without the payment to me of any royalty thereon.

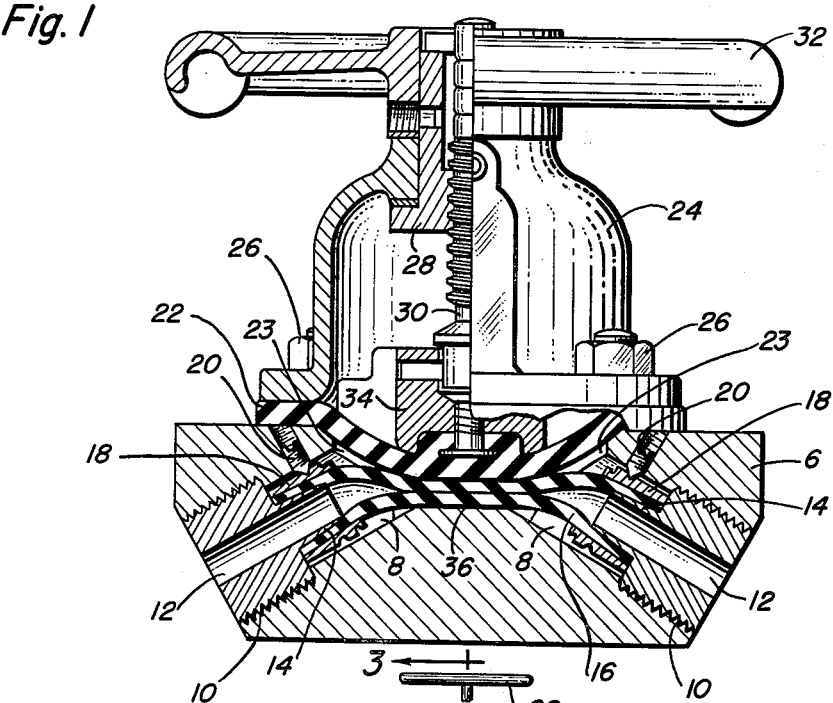
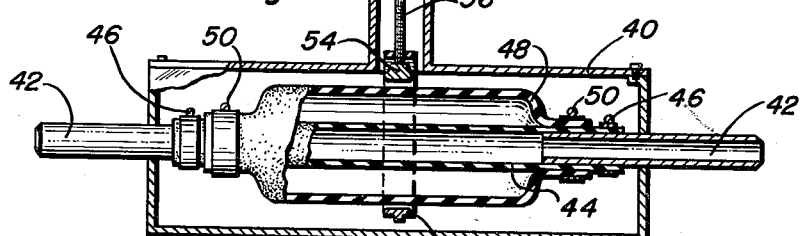
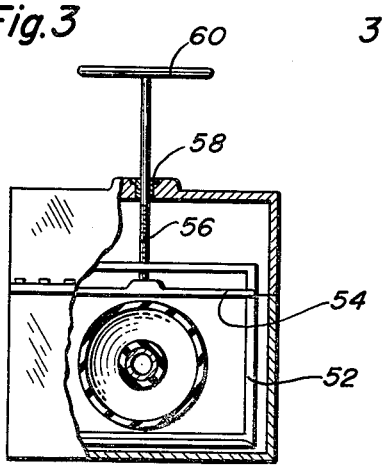
INVENTOR
Robert R. Freeman 2,994,337
DIAPINCH VALVE FOR HAZARDOUS MATERIALS
Robert R. Freeman, Pikesville, Md., assignor to the United States of America as represented by the Secretary of the Army
Filed Mar. 4, 1958, Ser. No. 719,174
4 Claims. (Cl. 137—312)
(Granted under Title 35, U.S. Code (1952), sec. 266)

This invention relates to a new type of valve which operates on the principle of pinching or compressing a flexible tube or conduit. More particularly, it relates to a pinch valve wherein the flexible conduit is surrounded or covered by a second flexible tube or a diaphragm that is closed or pinched over the main tube or conduit. The result is a pinch valve having a separate double wall at the point of closure. This second wall serves several purposes. The first and obvious purpose is to lengthen the life and service of the main conduit which is cushioned by being spared direct contact with the pinching element. A further purpose of the second wall is to create a sealed chamber between the flowing materials and the outside. This is especially valuable where the valve is used to handle fluids containing toxic materials such as pathogenic organisms or poisons. The valve is especially adaptable to the handling of such materials since the cavity or chamber between inner and outer conduits can then be filled with a decontaminating fluid so that in the event of rupture of the inner tube, any organisms passing this inner barrier will be killed or rendered harmless by the fluid. This same principle may be used where toxic chemicals are handled by the valve, in which case suitable neutralizing fluids may be placed in the cavity. An illustration of the latter is the use of chlorines or a chlorine generating fluid as a neutralizer for so-called mustard or di-chloroethyl sulfide which is an oily liquid that can be efficiently handled by such a valve. For use with a slurry of pathogenic organisms it is possible to use any of a large number of well known sterlizing fluids in the inner cavity. The valve is equally suitable for any other use where escape of fluid would be offensive or harmful in any way.

In the drawings, FIG. 1 shows a partial section through the valve and stem. FIG. 2 shows another modification of the valve of which FIG. 3 is a cross section at 3, 3 of FIG. 2. FIG. 4 is a perspective of the modification of FIG. 2.

More specifically, 6 shows the valve frame with a through passage 8, 8 having threaded inlet and outlet plugs 10, 10. The plugs have axial openings 12 and tapered conical ends 14 over which the flexible valve conduit 16 is placed. Solid compression sleeves 18 fit over the flexible tube and tapered ends. Set screws 20 hold the sleeves and end assemblies in position. Compression forces are applied through the secondary diaphragm 22 which fits over a central opening 23 in the valve frame and is held in position by the bell-shaped supporting frame 24 which is attached to the main frame 6 by means of stud bolts 26. The bell is fitted with central nut 28 through which main compression screw 30 passes. Hand wheel 32 serves to turn the screw and apply the compression forces to the diaphragm and main valve tube through compression block 34. The latter is molded in place in diaphragm 22 thereby eliminating relative movement between the two and also making it possible, not only to release pressure on the diaphragm, but also to lift the diaphragm away from the flexible conduit. FIG. 1 shows the valve in a closed position wherein the valve conduit 16 is closed by compression between diaphragm 22 and anvil 36 of the valve frame.

FIG. 2 shows a simplified version of the valve having a closed casing 40 with inlet and outlet tubes 42. The main valve conduit 44 is attached to the inlet-outlet tubes 42 by means of clamps 46. Outer tube 48 in turn is clamped over inner conduit by means of clamps 50. Compression is applied by a yoke 52, sliding bar 54 and screw 56. The latter passes through gland 58 and is actuated by hand wheel 60. Both of these valve modifications lend themselves to the uses indicated and it is to be understood that these modifications are by way of illustration only and that any form of the device wherein a secondary diaphragm or security seal is used, is contemplated.

The conduit and diaphragm may be constructed of any one of the many well known flexible plastics or elastomers. It is only necessary to choose a material that will prove inert to the particular fluid conveyed.

I claim:
1. A pinch valve having a valve body, inlet and outlet ports in said valve body, a flexible conduit connecting said inlet and outlet ports within said valve body, mechanical compression means positioned on said valve body intermediate said inlet and outlet ports, said compression means serving to compress said flexible conduit to thereby interrupt the flow of fluid in said flexible conduit, sealed chamber means surrounding said flexible conduit between said inlet and outlet ports to thereby confine any fluid that escapes due to a rupture of said flexible conduit, the walls of said chamber means including a secondary flexible means interposed between said flexible conduit and said mechanical compression means.

2. A pinch valve in accordance with claim 1 wherein the secondary flexible means envelops the flexible conduit and constitutes the sealed chamber means.

3. A pinch valve in accordance with claim 1 wherein the secondary flexible means is a diaphragm comprising one wall of said sealed chamber means.

4. A pinch valve in accordance with claim 3 wherein the compression means is molded together with the secondary flexible means.

References Cited in the file of this patent
UNITED STATES PATENTS

| | | |
|---|---|---|
| 1,128,327 | Keith | Feb. 16, 1915 |
| 1,772,210 | Dale | Aug. 5, 1930 |
| 1,872,792 | Neorr | Aug. 23, 1932 |
| 2,069,261 | Monnet | Feb. 2, 1937 |
| 2,769,397 | Bolger | Nov. 6, 1956 |
| 2,786,608 | Brown | Mar. 26, 1957 |
| 2,843,349 | Meyer | July 15, 1958 |
| 2,876,937 | Wilson | Mar. 10, 1959 |
| 2,904,063 | Wall | Sept. 15, 1959 |